US009513936B2

(12) United States Patent
Gallimore et al.

(10) Patent No.: US 9,513,936 B2
(45) Date of Patent: Dec. 6, 2016

(54) DYNAMICALLY LOADABLE COMPOSITE SOFTWARE APPLICATION

(71) Applicant: COMMONWEALTH BANK OF AUSTRALIA, Sydney (AU)

(72) Inventors: Edward Leigh Gallimore, Naremburn (AU); Benjamin Jan Zawada, Rozelle (AU); Craig Lincoln Hooper, Mittagong (AU); Ian Jeffrey Sorbello, Gosford (AU); David Morrison Pike, Ryde (AU); Timothy Robert Hogarth, Normanhurst (AU)

(73) Assignee: Commonwealth Bank of Australia, Sydney (AU)

(*) Notice: Subject to any disclaimer, the term of this patent is extended or adjusted under 35 U.S.C. 154(b) by 0 days.

(21) Appl. No.: 14/783,427

(22) PCT Filed: Apr. 11, 2014

(86) PCT No.: PCT/AU2014/050012
§ 371 (c)(1),
(2) Date: Oct. 8, 2015

(87) PCT Pub. No.: WO2014/165944
PCT Pub. Date: Oct. 16, 2014

(65) Prior Publication Data
US 2016/0055014 A1 Feb. 25, 2016

(30) Foreign Application Priority Data

Apr. 12, 2013 (AU) .............................. 2013205576

(51) Int. Cl.
*G06F 3/00* (2006.01)
*G06F 9/445* (2006.01)
*G06F 9/54* (2006.01)

(52) U.S. Cl.
CPC ............. *G06F 9/44521* (2013.01); *G06F 8/64* (2013.01); *G06F 9/54* (2013.01)

(58) Field of Classification Search
CPC ................. G06F 9/54; G06F 8/61; G06F 8/64
(Continued)

(56) References Cited

U.S. PATENT DOCUMENTS 5,732,275 A * 3/1998 Kullick ..................... G06F 8/65
713/1
7,827,494 B1 11/2010 Hedayatpour et al.
(Continued)

OTHER PUBLICATIONS

Kyung S. Park, A Structured methodology for comparative evaluation of user interface designs using usability criteria and measures, 1999.*

(Continued)

*Primary Examiner* — Lechi Truong
(74) *Attorney, Agent, or Firm* — Blakely, Sokoloff, Taylor & Zafman LLP

(57) ABSTRACT

The present invention provides a method of and system for dynamically loading an executable composite software application, for use on a user device. An enterprise universe including multiple application modules is maintained, with each application module being configured to perform a particular functionality within the software application. This universe is filtered in terms of a particular environment definition to result in an environment subset of application modules, wherein the environment definition defines criteria according to which application modules exist in the environment. In response to receiving a container launch request from a user device, one or more application modules from the environment subset is launched as the executable composite software application on the user device through a container module associated with the user device.

18 Claims, 15 Drawing Sheets

(58) Field of Classification Search
USPC .................................. 719/310; 717/173, 174
See application file for complete search history.

(56) References Cited

U.S. PATENT DOCUMENTS

| | | |
|---|---|---|
| 2002/0032695 A1 | 3/2002 | Blume et al. |
| 2004/0181779 A1 | 9/2004 | Gorti |
| 2008/0136818 A1* | 6/2008 | Matsuoka ............ G06T 19/006 345/427 |
| 2008/0141234 A1 | 6/2008 | Becker et al. |
| 2010/0169841 A1* | 7/2010 | Singh ................ G06F 17/30967 715/863 |
| 2011/0167498 A1* | 7/2011 | Wilson .................. G06F 21/125 726/27 |
| 2012/0005663 A1 | 1/2012 | Burckart et al. |
| 2013/0036459 A1* | 2/2013 | Liberman ............ H04L 9/0866 726/6 |

OTHER PUBLICATIONS

PCT Notification of Transmittal of the International Search Report and the Written Opinion of the International Searching Authority, or the Declaration for PCT Counterpart Application No. PCT/AU2014/050012, 9 pp., (Jul. 2, 2014).

* cited by examiner

DYNAMICALLY LOADABLE COMPOSITE SOFTWARE APPLICATION

CROSS-REFERENCE TO RELATED APPLICATIONS

This patent application is a U.S. National Phase Application under 35 U.S.C. §371 of International Application No. PCT/AU2014/050012, filed Apr. 11, 2014, entitled DYNAMICALLY LOADABLE COMPOSITE SOFTWARE APPLICATION, which claims priority to Australian Patent Application No. 2013205576, filed Apr. 12, 2013.

FIELD OF THE INVENTION

The invention relates to a method of and system for dynamically loading an executable composite software application. The invention extends to a related authentication system and method.

BACKGROUND OF THE INVENTION

Larger computer systems are typically initially developed to be programmatically modular subsystems. However, over time these systems invariably coalesce into monolithically managed and operated systems. The cause of this kind of entanglement and complexity in computer systems is endemic in large corporations and appears to be related to rapid organic growth on such systems when sufficiently large.

Related to this type of complexity of large computer systems is the fact that information technology (IT) system within a larger group entity (such as a corporation) is typically built as a single, manageable unit. However, if successful and popular, the system is often expanded by adding components and extending features, thereby broadening the functional breadth of the system. This expansion is usually facilitated by IT developer teams relying on the re-use and extension of the original system. The problem that emerges from this approach is that although the additional components built into the system may be developed incrementally, quickly and easily, it becomes exceeding difficult to change the further component at a later stage. Entropy accordingly creeps into the system. Additionally, even as the system is broadened into different functional domains, it is likely to still be managed and operated as a single system.

In the light of the above, software applications are facing significant challenges around speed of change, especially in an environment that should support mobile and consumer device readiness and the portability of functions across different customer segments.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

According to a first aspect of the invention there is provided a method of dynamically loading an executable composite software application for use on a user device, the method including:

maintaining an enterprise universe including multiple application modules, each application module being configured to perform a particular functionality within the software application;

filtering the enterprise universe in terms of a particular environment definition to result in an environment subset of application modules, wherein the environment definition defines criteria according to which application modules exist in the environment;

in response to receiving a container launch request from a user device, launching, as the executable composite software application on the user device, one or more application modules from the environment subset through a container module associated with the user device.

Typically, one of the criteria defined by the environment definition is a minimum certification level of an application module.

Preferably, another of the criteria defined by the environment definition is a piloting requirement that determines introduction of versioned application modules in the environment.

The method may include, after the step of filtering, determining whether any application module in the environment subset of applications is dependent on an application module not in the environment subset, in response to which such dependent application module is excluded from the environment subset.

Typically, the one or more application modules which are launched as the composite software application is further dependent on user information received as part of the container launch request.

If the user information received as part, of the container launch request includes user identification information, the method preferably further comprises filtering the available environment subset of application modules against a criterion of the environment definition which specifies a predefined user level of authentication.

The method may additionally comprise determining the version of application module to be launched from the environment subset, based on the piloting requirement.

According to a further aspect of the invention there is provided a networked system including:
one or more servers including:
multiple application modules, each application module being configured to perform a particular functionality within the software application;
multiple container modules which may be used to launch application modules as an executable composite software application from a user device,
one or more processors;
memory; and
one or more programs, wherein the one or more programs are stored in the memory and configured to be executed by the one or more processors, the programs including:
instructions for receiving criteria from a user to form a particular environment definition which is used to filter the multiple application modules into an environment subset of application modules;
instructions for receiving a container launch request from a user device, and
instructions for launching, as an executable composite soft ware application, one or more application modules from the environment subset through one of the container module associated with the user device.

Typically, one of the criteria defined by the environment definition is a minimum certification level of an application module.

Preferably, another of the criteria defined by the environment definition is a piloting requirement that determines introduction of versioned application modules in the environment.

The program may further include instructions for, after the step of filtering, determining whether any application module in the environment subset is dependent on an application module not in the environment subset, in response to which such dependent application module is excluded from the environment subset.

The one or more processors and/or memory may form part of one or more servers, such as the one or more servers hosting the multiple application modules and the multiple container modules.

According to yet a further aspect of the invention there is provided a method to facilitate the dynamic loading of an executable composite software application on a user device, the method including:
maintaining:
multiple application modules, each application module being configured to perform a particular functionality within the software application;
multiple container modules which may be used to launch application modules as an executable composite software application from a user device;
receiving different criteria from a user, the criteria used to loan a particular environment definition which is to be used to filter the multiple application modules into an environment subset of application modules, wherein the criteria is selected from a group at least including a minimum certification level of an application module and a predefined user level of authentication, wherein the executable composite software application is to be launched from the environment subset of application modules through one of the container module associated with the user device.

Preferably, other criteria defined by the environment definition may be piloting requirements that determine the introduction of versioned application modules in the environment.

According to yet a further aspect of the invention there is provided a networked system configured to facilitate the dynamic loading of an executable composite software application on a user device, the networked system including:
one or more servers hosting:
multiple application modules, each application module being configured to perform a particular functionality within the software application;
multiple container modules which may be used to launch application modules as an executable composite software application from a user device;
one or more processors;
memory; and
one or more programs, wherein the one or more programs are stored in the memory and configured to be executed by the one or more processors, the programs including:
instructions for receiving different criteria from a user, the criteria used to form a particular environment definition which is to be used to filter the multiple application modules into an environment subset of application modules, wherein the criteria is selected from a group at least including a minimum certification level of an application module and a predefined user level of authentication, wherein the executable composite software application is to be launched from the environment subset of application modules through one of the container module associated with the user device.

Preferably, other criteria defined by the environment definition may be piloting requirements that determine the introduction of versioned application modules in the environment.

The one or more processors and/or memory may form part of one or more servers, such as the one or more servers hosting the multiple application modules and the multiple container modules.

According to yet another aspect of the present invention there is provided an authentication method for the launch of an executable composite software application, the method including:
in response to receiving a container launch request from a user device, launching as the executable composite software application and through a container module associated with the user device, one or more application modules which require no user authentication;
receiving a request to access an application module which requires user authentication;
determining the type of identity of the user by assessing the context within which the user accesses the container module;
providing the container module with an authenticator application module which corresponds to the user identity type;
authenticating the user; and
launching application modules with a signed identity token from the container module.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

The Networked System

Figure 1:
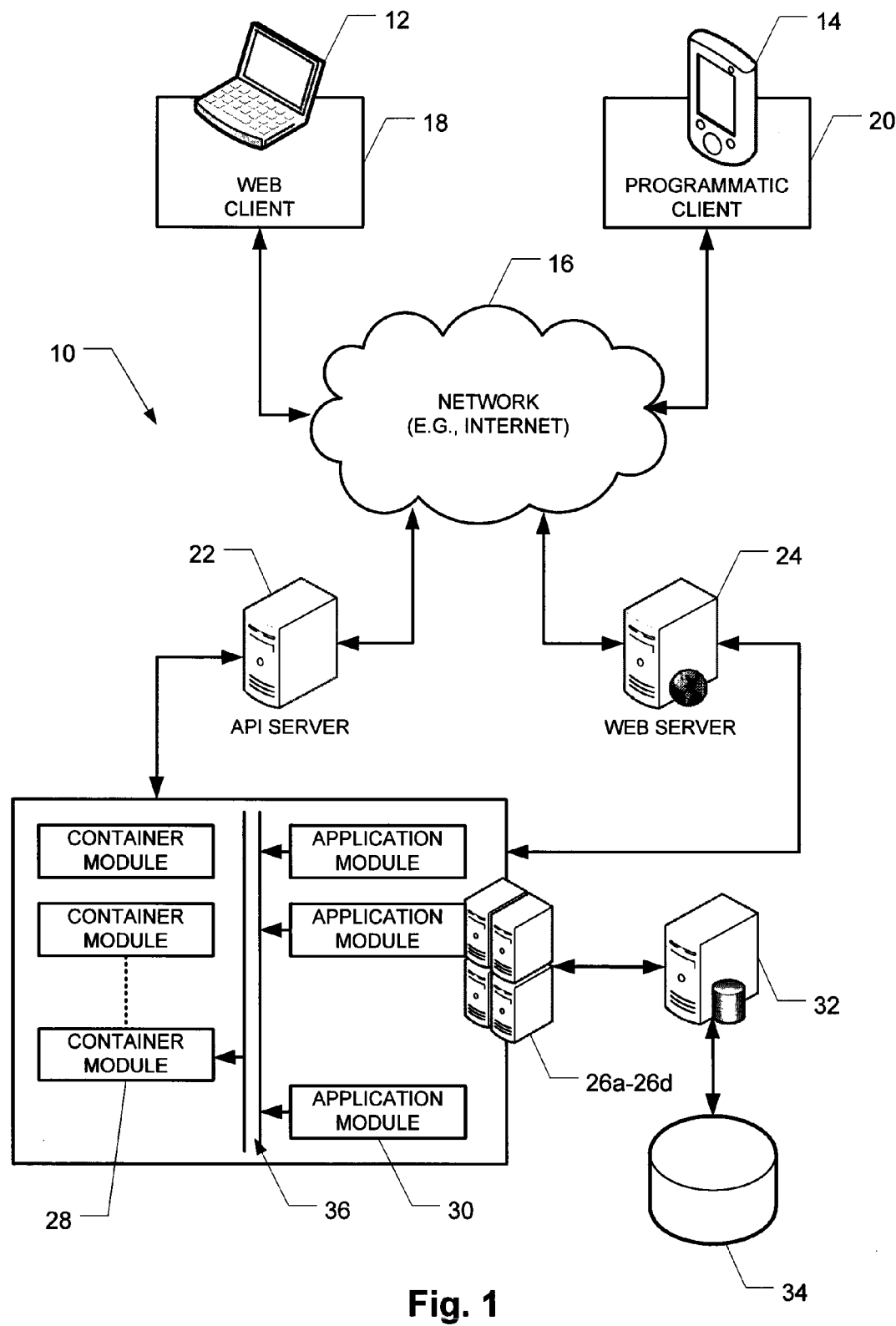
FIG. 1 shows a network diagram of a system in accordance with an example embodiment of the invention.

FIG. 1 shows a high-level diagram of a networked system generally indicated by reference numeral 10 in accordance with an example embodiment. The networked system 10 comprises various user devices, in this example embodiment shown by a personal computer 12 and a mobile phone 14, which are connected by a network 16 and utilised by users not shown) to interact with the networked system 10. The networked system 10 provides server-side functionality, via the network 16 (e.g., the Internet or a Wide Area Network (WAN)) to the users of the system 10. For example, FIG. 1 illustrates a web client 18 (e.g., a browser, such as the Internet Explorer browser or Google Chrome) executing on the personal computer 12, while a programmatic client 20, e.g., in the form of a native application downloaded from an application store or market, is executed on the mobile phone 14. It will be appreciated that the mobile phone could be any type of suitable mobile communication device, such as a smart phone, a tablet or the like.

An Application Program interface (API) server 22 and a web server 24 are coupled to, and provide programmatic and web interfaces respectively to a number of servers 26a to 26d which host various container modules 28 and application modules 30. In accordance with an example embodiment of the invention. The various servers 26a to 26d may, in turn, be coupled to at least one database server 32 that facilitates access to one or more data stores, represented in FIG. 1 by database 34.

While the system 10 shown in FIG. 1 employs a client-server architecture, the present invention is not limited to such an architecture, and could equally well find application in a distributed, or peer-to-peer, architecture system, for example.

The web client 18 accesses various container and application modules 28 and 30 via the web interface supported by the web server 24. Similarly, the programmatic client 20 accesses the modules 28 and 30 via the programmatic interface provided by the API server 22.

The container modules 28 and application modules 30 of the networked system 10 may be hosted on dedicated or shared server machines (not shown) that are communicatively coupled to enable communications between server machines. The application modules 30 themselves are communicatively coupled via an appropriate interface 36 to the container modules 28. As will be described in more detail below, the application modules 30 typically communicate with each other only through the interface 36, and no direct communication between application modules 30 are allowed. Information flow also occurs with the database server 32, which is coupled to the one or more databases 34.

The networked system 10 comprises one or more processors and memory on which is stored one or more programs. The programs are configured to be executed by the processors and include instructions to perform multiple functionalities which are described in more detail below. The one or more processors and/or memory may form part of one or more servers, such as the one or more servers hosting the multiple application modules and the multiple container modules, the servers 26a to 26d or the like.

The networked system 10 of an example embodiment of the present invention allows for the loading also called launching) of an executable software application, such as a web page or application on a user device 12 or 14 when a user, e.g., a staff member, a customer or a customer delegate of an organisation, vendor or the like, accesses one of the container modules 28. The user may either log on anonymously or may provide authentication information in order to access the software application. For example, the user may enter a user-ID and password, make use a dangle, or the like. In launching the executable software application, one of the container modules 28 is accessed by the user, which container module 28 then activates a process by which a number of application modules 30 are employed and assembled in a user interface with which the user interacts.

As a first step, the particular container module 28 may verify the user credentials against an appropriate security database. In such a scenario, the networked system 10 creates a security token and adds that data to the container module session. Application modules are able to read and interpret the security token and use the identity as they see fit. This process is described in more detail, below.

One of the important functionalities provided by the networked system 10 is to segregate functions which a user is to execute in the software application (via the container module 28) into the small application modules, each of which is capable of functioning independently. This allows for the portability of application modules 30 across various environments and possibly universes, thereby allowing their use in multiple channels and/or container modules, with each application module 30 having an independent software life cycle. The application modules 30 may thus be accessed by many different types of users without any need to rewrite the modules.

The application modules 30 launched together through a container module 28 inherit some common technical behaviour. As will be described in more detail below, the launch process of the various application modules 30 is dependent on characteristics as defined in an application manifest which is associated and forms part of each of the application modules 30.

In order to accomplish the mentioned portability, transparent and seamless security models working across channels (e.g., CommSee, NetBank, etc) for multiple user types (staff, customers, partners, other users, etc) are implemented. Further details on this also follow below.

Container Modules

Each container module 28 functions as an executable software application of the networked system 10. The container modules 28 shown in FIG. 1 are responsible for loading (i.e. launching), managing and unloading application modules 30 in order to provide to users, through either the web browser 18 or programmatic client 20 on the user devices 12 and 14, various functionality via, a user interface. The container modules 28 both define and contain the user interface and experience.

On a mobile phone 14 of FIG. 1 the container module 28 is in one example embodiment associated with a native application that is launched through selecting an icon on the graphical user interface (GUI) of the mobile device, while on a personal computer 12, the container module 28 may be associated with the website URL that is entered into the web browser 18 by the user.

Figure 2:
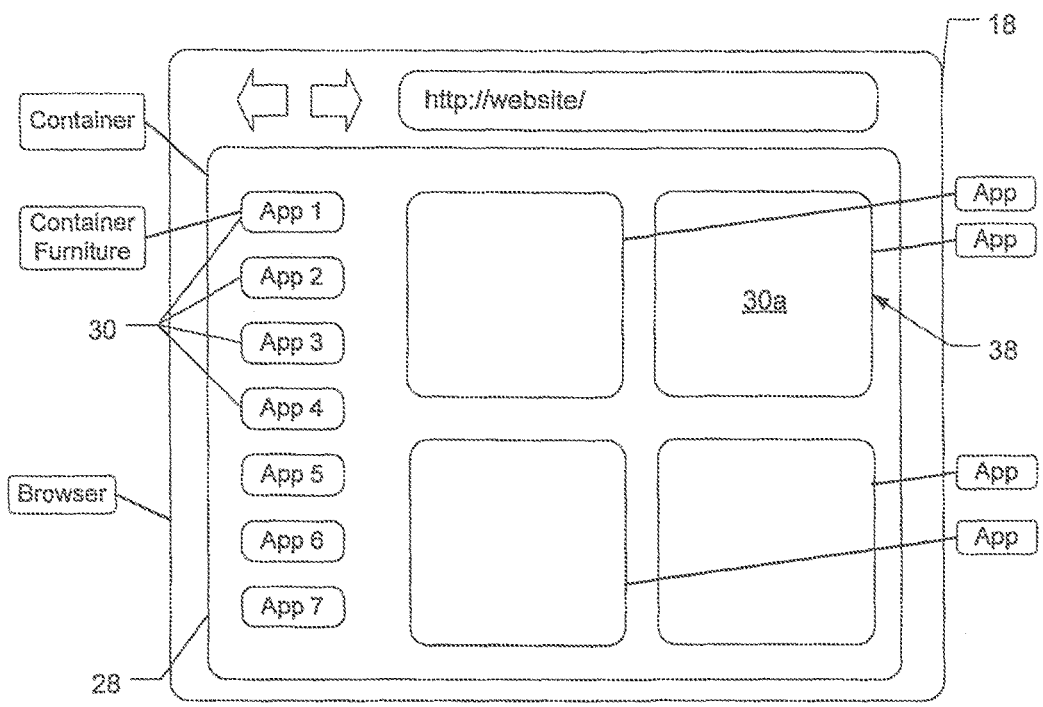
FIG. 2 shows a simplified website layout indicating the relationship between a container module and various application modules, in accordance with an example embodiment.

FIG. 2 shows a simplified website layout indicating the relationship between a container module 28 and various application modules 30 launched through the container module 28. The container module 28 runs inside a web browser 18 and has furniture, which in this example embodiment is shown as different application modules 30. A number of application modules, one of which is indicated by reference numeral 30a, are hosted in a defined, region inside the container module 28, as indicated by arrow 38.

Each container module 28 typically has associated with it a distinct 'look and feel' which is inherited by the application modules 30 loaded or launched by the container module 28, thereby providing a unique brand to the particular container module 28, when run by the user.

An example of a container module may be a particular mobile banking framework, such as the Kaching framework, or the CommSee Harness of the applicant.

Each container module 28 is directed to a particular channel and/or device, and assembles multiple application modules 30 into a cohesive experience. For example, a particular container module 28 may be directed to an iOS App for an iPhone 5, while another container module may be for an iPad or for a Google Chrome web browser. This cohesive experience is accomplished by controlling the loading and unloading of application modules 30 into a particular container module 28. The container module 28 is typically responsible for the following aspects within a launched composite software application:

menu and navigational features;
page furniture (e.g., headers and footers);
user context;
communication (e.g., message passing) between application modules launched through the container module;
user authentication;
coarse grained entitlements; and
piloting of application modules.

Some of these features are expanded upon later in the specification.

Figure 3:
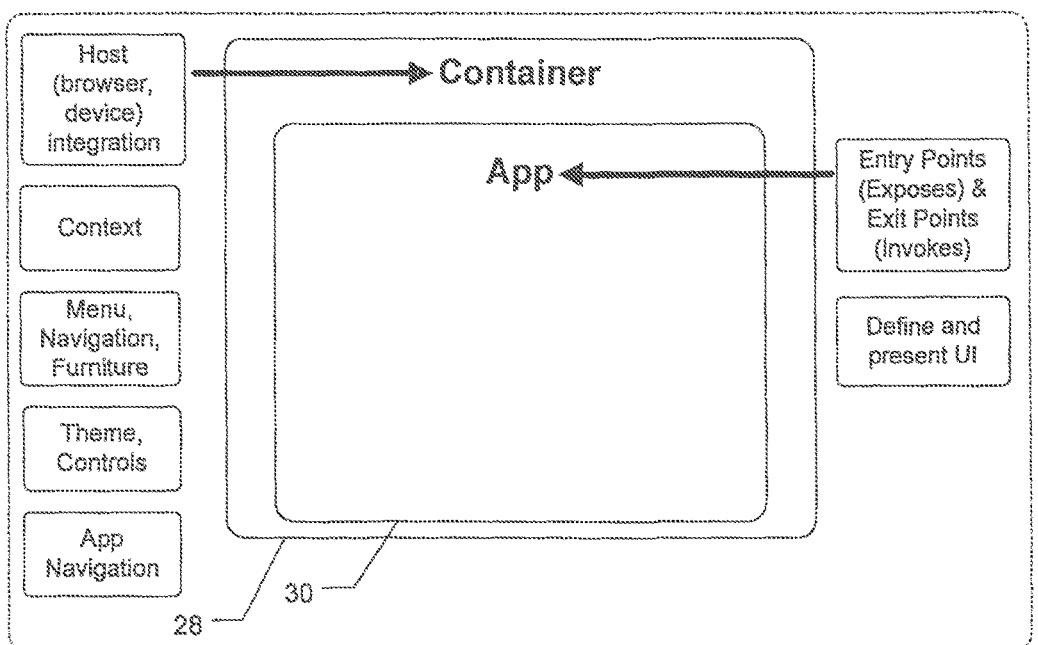
FIG. 3 shows a simplified diagram of functionalities and attributes of a container module and application modules, in accordance with an example embodiment.

FIG. 3 shows diagrammatically some attributes and the aspects controlled by the container module 28 within a composite software application, such as host integration, context, menu, navigation and furniture, theme and controls, as well as application navigation. Similarly, aspects controlled by the application modules 30 within a composite software application are shown, e.g., entry points (which exposes) and exit points (which invokes) and a user interface which is typically defined and presented by the application module.

It is important to appreciate that the container modules 28 generally do not perform business functions or functionality, but that such functions are generally in the domain of the application modules 30.

Application Modules

An application module 30, when launched through a container module 28, is typically a website comprising one or more web pages, or an executable software program. As mentioned above each application module 30 is logically isolated from other application modules 30 and where communication or data sharing is necessary between application modules 30, a specific interface 36 is provided which ensures that applications modules 30 are not directly coupled and do not communicate directly with each other. Also application modules 30 could, but need not be interdependent.

Each application module 30 is associated with a particular business function and provides a user interface which allows a user to perform such function. An application module 30 typically has a single reusable code component. Depending on the type of business function, one or more user interfaces may be contained in the application module 30.

In some instances, an application module 30 could perform functionality relating to only part of a business domain, provided that the module accomplishes a task that a user would want to achieve in one interaction.

An application module 30 may be configured to have multiple user interfaces, some of which are visible and accessible to only a subset of users. Such interfaces with associated limitations may become available to a particular user only after the user has been authenticated during a suitable process. Alternatively, an application module 30 may be tailored to a subset of users. The availability or presentation of application modules 30 is managed through the container module 28 that launches the application modules 30. This, in combination of the use of an environment definition, is described in more detail below.

Figure 4:
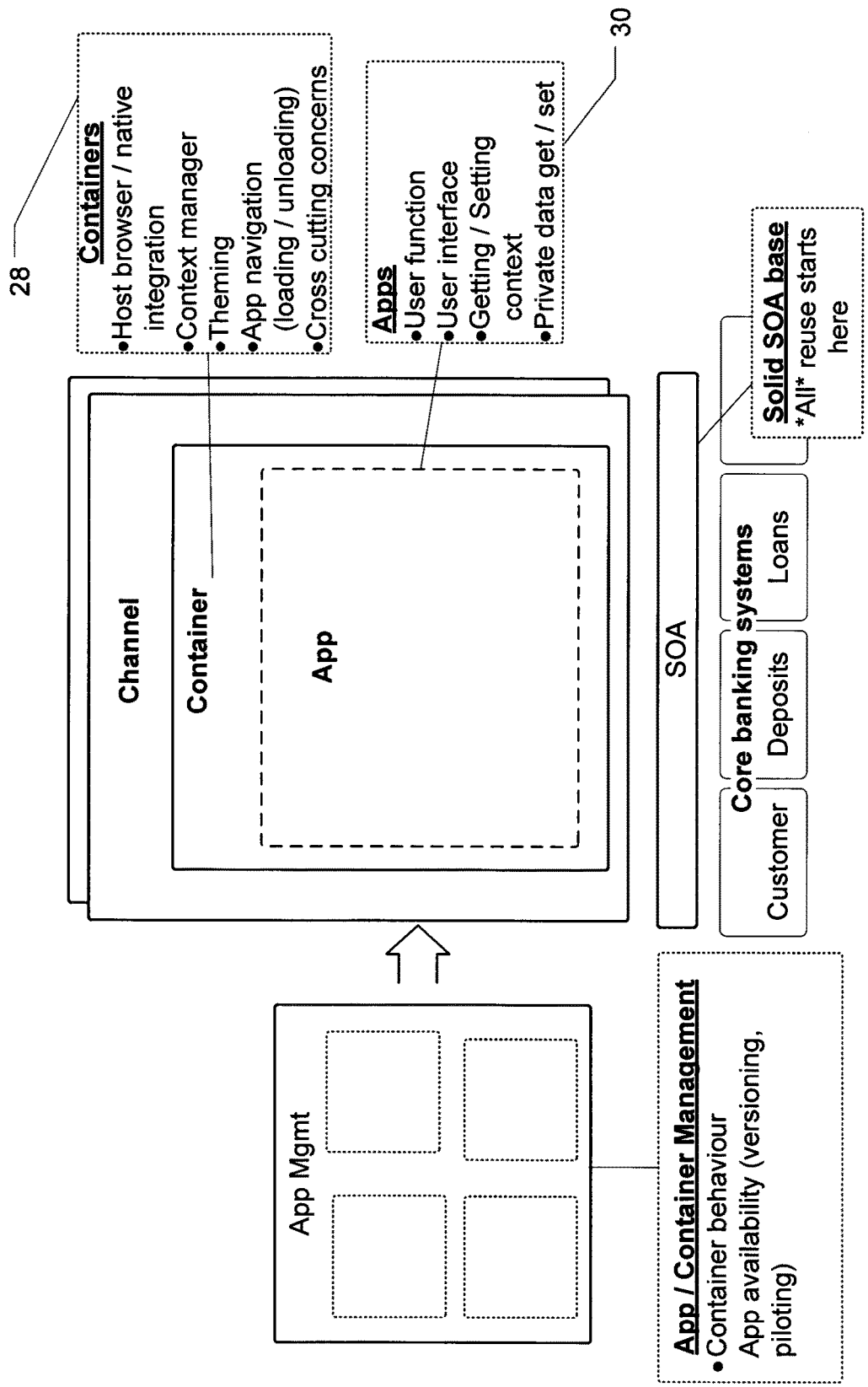
FIG. 4 shows a further diagram of functionalities and attributes of application management, channels, a container module and application modules, in accordance with an example embodiment.

An application module 30 as an executable is not tied to any particular type of technology but the choice of technology will influence the environment in which it can be executed. A container module 28 supports one or more application modules 30 to run within it, given certain criteria (mentioned above and defined, for example, in terms of an environment) which the container module 28 may impose. In general, the application modules 30 of the present invention provide logical, versioned, end-points for container modules 28 and application modules 30 to call in order to access data. See for example the attributes and functionalities of various components shown in FIG. 4.

As indicated, application and container module management extends to container module behaviour and application module availability (versioning and piloting). Already mentioned above, attributes and functionalities of the container modules extend to a host browser, native integration, context manager, theming, application navigation (loading and unloading) as well as cross cutting concerns. Application module attributes and functionalities are shown to include user functions, user interfaces, getting or soling context, and getting or setting private data.

An application module 30 is immutable once it has been created and is thus always associated with a version number. This means any type of change to an application module 30 must at all times result in a change to the version of the application module 30.

Specific examples of application modules 30 in a banking context are transaction history pages, bank lending screens, login pages, search screens or the like.

Application Module Manifest

Figure 5:
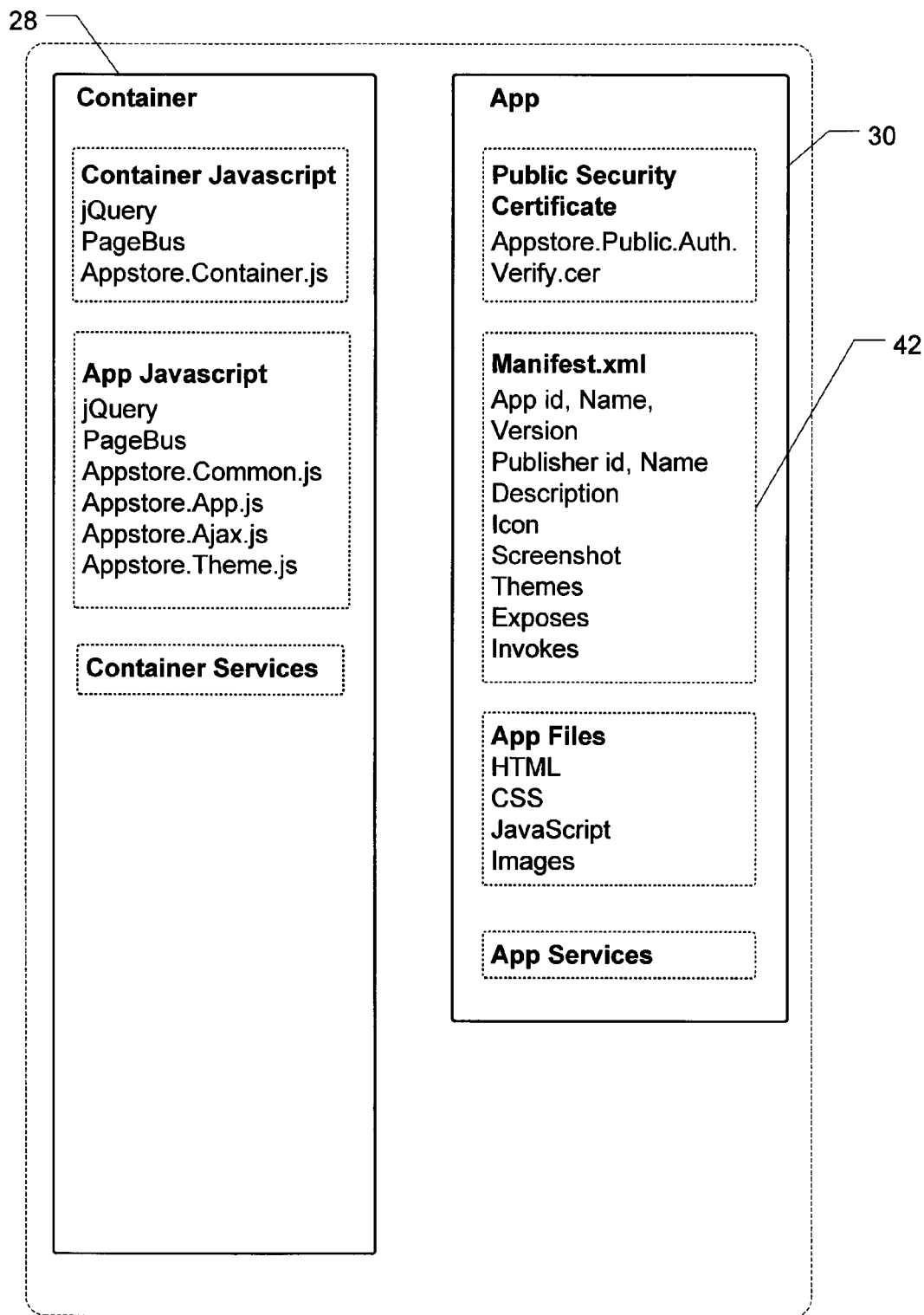
FIG. 5 diagrammatically shows example files hosted respectively by a container module and an application module, in accordance with an example embodiment.

Referring to FIG. 5, which shows various files hosted respectively by a container module 28 and an application module 30, an application module 30 is shown to have an application module manifest 42 associated with it. The application module manifest 42 contains all metadata (e.g., what the application module is and what it does) of the particular application module 30. In particular, the application module manifest 42 may declare the application module's name, its ID, purpose (i.e. a description), publisher ID (i.e. name of the team that wrote it), the interfaces it exposes (e.g., icons, screenshots and themes), the services or endpoints it calls (dependencies), its version and other useful information.

An example manifest for a transaction history application module would declare the following:

Publisher: Online Solutions
Interface with: RetrieveInvolvedParty SOA service
Version: 1.1.203

The example of FIG. 5 shows a container module 28 comprises "App JavaScript" files that are used by the application modules 30 that are run by the container module 28. As is well-known, App JavaScript is standard frameworks and/or libraries, as well as App Store framework JavaScript that all application modules should use to gain maximum benefits and/or consistency, e.g. in terms of themes, controls etc.

Publisher

As mentioned, part of the application module manifest 42 is information on the publisher of an application module 30. The publisher (shown by reference numeral 48 in FIG. 7) is a person or team that produces the application module 30, i.e. the team that writes the code, that is responsible for the further development and testing of the application module 30, and ultimately for the management of the application module life cycle. The purpose of having a publisher and stipulating the publisher details in the application module manifest 42 is to have accountability for support and ownership of the application module 30.

Host

During the life cycle of an application module 30, the module will be deployed to one or more hosts and is to be accessed from there. A host is not tied to a particular publisher 48 and it is accordingly possible that a host (reference numeral 44 in FIG. 7) may hold various applications modules 30 from different publishers 48.

Figure 6:
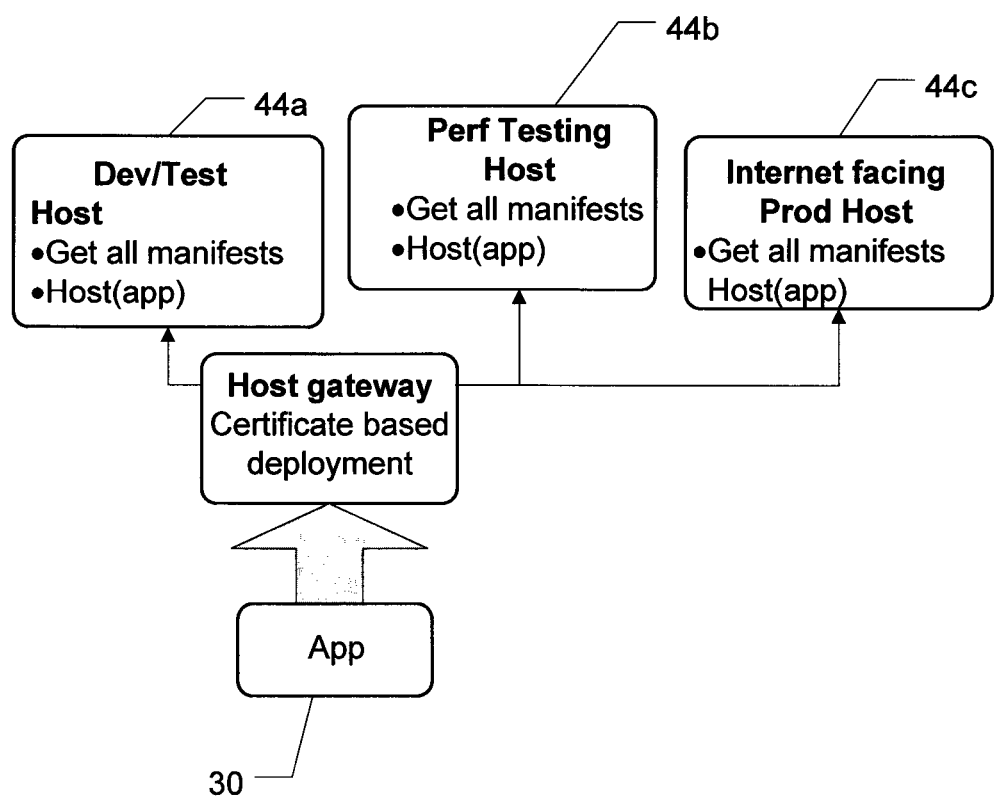
FIG. 6 diagrammatically shows the deployment of an application module through a host gateway to one of multiple different hosts, in accordance with an example embodiment.

Different hosts 44 serve different purposes and the particular host from where an application module 30 is hosted is dependent on the application module certificate (which is described in more detail below) of the particular application module 30. FIG. 6 shows different hosts 44 within an example embodiment of the invention, such as:

Development/Test Host 44a: this host will receive all new versions of application modules 30;

Performance Testing Host 44b: this host will only receive application modules 30 that have obtained certificates indicating that a certain level of testing has been passed; and Internet Facing Product Host 44c: only application modules 30 that have achieved certificates allowing production will be deployed here. Examples of such certificates may be certificates indicating successful completion of performance testing, penetration testing, etc.

A host 44 must expose the following services:

Host(App): Loads an application into the host; and

GetAllManifests: This will return all the application module manifests of the application modules that the host is storing.

Certificates

As mentioned above, application modules 30 are moved into production based on their individual certification by a team or a system, after the completion of an appropriate test, e.g., UAT code review, completed documentation, penetration testing, performance testing, operational readiness. A certificate in the context of the invention refers to the confirmation of certain characteristics of an application module 30 which is recorded in the application module manifest 42.

The owner of the application module 30 is able to obtain information on the certification authority for each version of the application module 30, as a certificate only applies to a specific version of an application module 30. Based on such certification, the owner of the application module 30 is able to make piloting or deployment decisions on the application module 30.

Certificates provide a powerful way to ensure that the accountability of quality assurance teams is transparent. It also allows the owner of the container module 28 to apply exemptions and not require all teams to certify all application modules.

Examples of certificates include "Passed system test", "Passed Penetration Test" and "Code Review completed".

Certificate Authority

Figure 7:
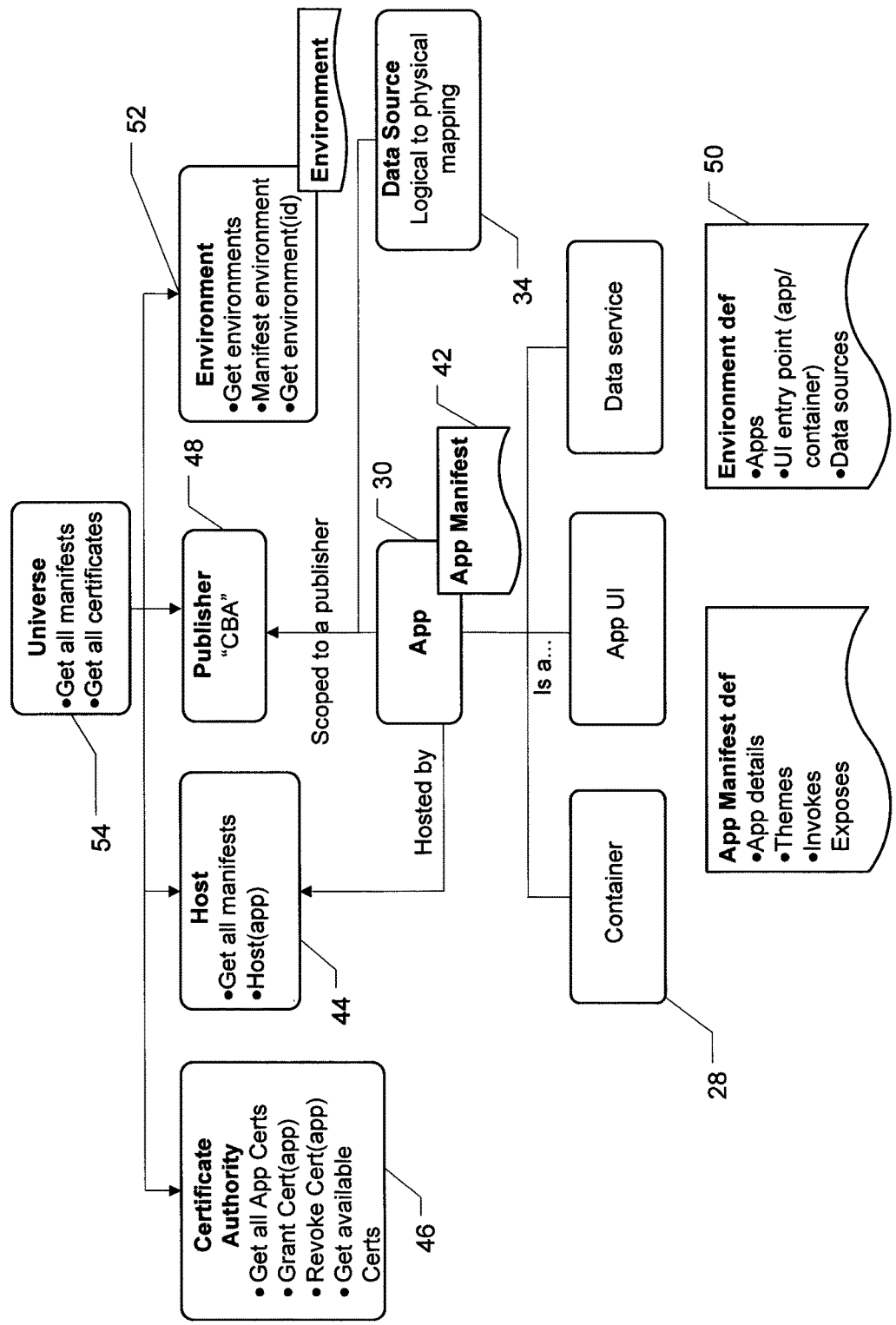
FIG. 7 is a simplified block diagram showing some attributes of, and the interplay between, various components and environments, of the networked system of FIG. 1, in accordance with an example embodiment.

It follows from the above that a certification authority, shown by reference numeral 46 in the component overview diagram of FIG. 7, is a team or system that warrants that a specific version of a specific application module 30 has passed a particular test. Certificate authorities 46 issue certificates, in response to which an application module 30 may be released (or not). The type of certificate determines to what extent and to which host 44 an application module 30 may be released.

A certificate authority 46 must perform the following services:

GrantCertificate(certificate, app): Grant a certificate to an application module.

GetAllApplicationCertificates( ): Provide a list of all application modules and the certificates granted by this particular authority.

RevokeCertificate(certificate,app): Revoke a certificate for an application module.

GetAvailableCertificateTypes( ): Get a list of all the certificates that can be issued by the authority.

Examples of certifying authorities are Testers, Tech Leads, Performance Teams, Penetration Testers, Business Stakeholders, Customer Support, etc.

Environments

Environment definitions 50 are used to stipulate a number of dimensions of data, each 'environment' 52 being an input to the selection of viable application modules 30 for the running of a container module 28. An environment definition is accordingly linked to one or more container modules 28. An environment definition 50 may either be 'synthetic' or 'manifested'.

An environment 52 in terms of the present invention differs from traditional environments where applications are normally physically moved between different server infrastructure (i.e. first, in the Development Environment, then one or more Test Environment, followed by a Staging Environment, finally ending in a Production Environment). The present invention allows application modules 30 to be present on one single server (as an example), while being pointed at different databases 34 through its manifest 42. This allows application modules 30 to be instantly and seamlessly tested in multiple environments by multiple users.

The application modules 30 that could be used in a particular environment 52 may be determined by the application module version, which marks the relevance of a particular application module 30 to an environment 52 and the versions that should be used. It is notable that multiple versions may be selected through an environment definition 50 and that piloting distribution schemes may push for such multiple versions to be employed to the container modules 28.

An environment definition 50 of an environment 52 may also specify a level of certification needed for a particular application module 30 to be employed in the environment. Each application module 30 is certified according to its own process, but the environment definition 50 allows only those application modules 30 that have the right level of certification to be deployed. For example, an application module 30 may due to its edification level be loadable in a developer environment, but not a production environment.

Environment definitions are usually set or created by receiving different criteria from a user, where the criteria is to be used to form a particular environment definition according to which multiple application modules are to be filtered into an environment subset of application modules. A user interface, associated with the system, for example any of the system servers, may be used to enter the criteria.

In one example, the criteria are selected from a group (which may be listed on the interface). The group of criteria may at least include a minimum certification level of an application module and a predefined user level of authentication. Other criteria, such as mentioned below, may also be selectable.

Synthetic Environments

A synthetic environment has an environment definition which extends to a set of application modules 30 meeting a set of criteria such as particular publishers, version numbers, level of certification), a set of data sources (qualified by endpoints such as 'test') and an entry point to launch a user interface, where the entry point is usually a container module.

An example of an environment can be something like 'NetBank Staging' which has a definition to capture the sum of application modules that are in production (i.e. application modules with certificates indicating a 'production' rating) as well as any application modules that has certificates and possibly versions that signify new application modules ready to go into production.

This approach is a significant departure from the traditional paradigm where an environment is considered a set of data sources and the applications are packaged together and put into this environment. Application modules 30 are not coupled and packaged together when using the present invention, which means that the concept of a collection of applications provided to a user is passed upon a different set of criteria that determines what application modules 30 are accessible. This approach allows significant agility as it allows different projects working and releasing independently. A specific example of a synthetic environment is provided later in the document.

Manifested Environments

As application modules 30 are released independently, each execution of a synthetic environment may result in a different permutation of application modules running based upon their certificates and versions (and potentially piloting). This may be undesirable for users e.g., testers, who need a level of consistency in the environment for a period of time.

A manifested environment is the actual permutation of application modules 30 and data sources 34 at a point in time where a synthetic environment is executed. In the manifested environment a snapshot is taken which guarantees a user that the same application modules and physical data sources are used each time the manifested environment is executed (minus piloting which is always executed at runtime).

These services to be performed are:
GetEnvironment(id): retrieve a synthetic/manifested environment definition.
ManifestEnvironment(id): create a manifested environment and return a unique identifier for this.
GetEnvironments( ): return all known environment definitions (synthetics and manifested).

Universe

A universe 54 is the space where a set of application modules 30, container modules 28, hosts 44, publishers 48 and certifying authorities 41 are all known to each other. Thus, a universe 54 represents all known elements for a given set and is, in a sense, the source of all application modules 30. In creating application modules, amending such modules and continuously updating information relating to the application modules, a universe is maintained. It also follows that environments are subsets of a universe.

A universe is the space where any particular application module 30 may be referenced, including a running history of all of its published versions. It is viewed as a static pool of reference-able applications. As shown in FIG. 7, a universe 54 obtains information on all manifests of application modules 30 from the hosts 44 and also obtains all certificates from the certificate authority 46.

The universe 54 has to be considered against the backdrop of multiple application modules 30 existing which are not linked. For example, application modules 30 may be available to two sets of enterprises (e.g., two banking entities such as BankWest and CBA) which may not likely be aware of each other (due to organisational and network boundaries). These application modules 30 could thus be said to be in two separate 'universes'.

A universe 54 brings together a set of certificate authorities 46, a set of hosts 44 and a set of environments 52.

A user of the container modules 30 would unlikely need to know about the existence of the universe 54 but this configuration allows a level of administration such as used for mission control.

Data Sources

In terms of an example embodiment of the present invention, a data source 34 is a representation and encapsulation of a data source which is not built or configured to integrate with the networked system 10 and, as such does not adhere to the principles that apply to the networked system such as declarations of dependencies, etc.

A specific data source 34 may be a subset of a particular main database, and will typically follow a naming convention to allow easier identification of the type of data source, its origin and the subset covered.

A data source 34 is typically scoped to a particular publisher 48 and often exists in different versions. Depending on the purpose of the data source, different data may be available, e.g., for testing and production.

An attribute of a data source 34 is an endpoint or address which allows qualification of the data source's purpose.

With reference now to the description above, an interplay of all the components (and definitions) of the networked system 10 is shown by FIG. 7, which shows a universe 54 having access to all manifests 42 and certificates of application modules 30. This information is obtained from the certificate authorities 46, hosts 44, publishers 48 and environments 52. Application modules 30, in turn, are hosted by the hosts 44, and scoped and published by the publishers 48. Each application module 30 is shown to have an application manifest 42.

According to the environment definitions 50, various application modules 30 are grouped together, as well as user interface entry points (i.e. container modules 28) and data sources.

Architecture

Figure 8:
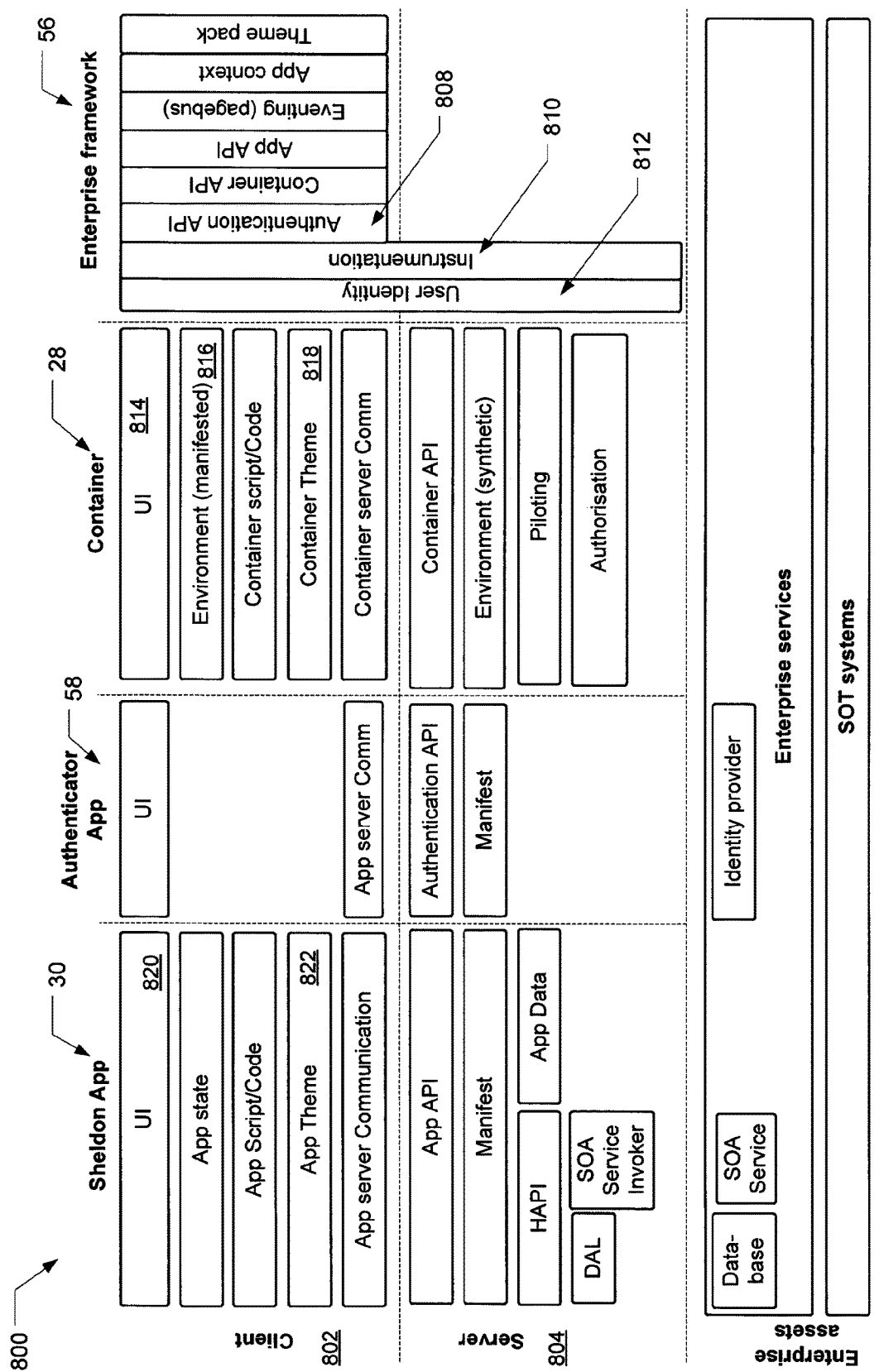
FIG. 8 is an example logical layer diagram of the networked system of FIG. 1.

The architecture of the networked system 10 of an example embodiment of the present invention may be viewed vertically by tiers, as well as horizontally in terms of what and where capabilities are leveraged. This is shown by the logical layer diagram 800 of FIG. 8.

Vertical Architecture

Client side 802: This is what the users see and access. As mentioned above, the client side architecture may be a web browser 18 or a programmatic client 20 such as a native client on a mobile device 14.

Server side 804: This is where the application modules 30 are hosted and executed, except for programmatic clients with a user interface. Programmatic clients are deployed on the client side with their native container.

Enterprise assets 806: These are the shared assets for the enterprise that are relied upon.

Horizontally

Enterprise framework 56: In terms of the client side, the enterprise framework 56 provides support for running the individual application modules 30 on the client side 802. Support, in the form of application program interfaces (APIs) 808, is provided to communicate and/or navigate between the different modules, as well as to provide the identity of the user to the application modules 30. The APIs 808 communicate with an authentication application module 58 (described below), a container module 28 and various application modules, one of which is shown by reference numeral 30 in FIG. 8. The enterprise framework 56 may also provide a set of themes that are applicable to the main brands of the enterprise.

Instrumentation 810 and identity 812 crosses the client and server tiers 802, 804 as instrumentation is applicable on both client and server side while the user identity 812 usually flows across the tiers such as with any request.

Container application module 28: This is where a container module 28 is usually composed. The container module 28 provides a user interface 814 and is dependent on a manifested environment 816, as described above. A container theme 818 specifies the 'look and feel' of the user interface 814.

Authenticator application module 58: When a user accesses a container module 28, the user will be prompted for credentials when required (i.e. when the user does not use the container module 28 anonymously). A set of security application modules support this authentication process, in particular, these modules will obtain the user credentials, verify the identity of the user and get a security token back to complete the authentication process of the user.

Application module: Application modules 30 have been described at length above, but it suffices to say that each application module 30 has a user interface 820 and theme 822 which is obtained from the container module 28. As is apparent from FIG. 8, communication between the various modules (i.e. application modules 30, authentication application module 58 and container module 30) occurs on a channel and is not directly with each other.

Launching a Container Module

Federated authentication of the various application modules 30 underpins the security of the networked enterprise system 10 of the present invention. This federated authentication enables a multi-identity provider integration capability as part of its core architecture. Thus, multiple teams could provide, application modules 30 for integration in container modules 28, without such teams needing to consider complex authentication requirements of the various container modules 30. Security events are split into container module authentication processes, and application module authentication processes.

In an example embodiment of the present invention security is applied differently to the security of typical online channels. Actor authentication, and the way that a user interaction session through a container module 28 is distributed amongst an eco-system of application modules 30 (which are potentially hosted under different logical and/or physical farms and/or technologies), require an extension to the prior art security patterns.

Access Control

Access control to the networked system, i.e. what a user is allowed to see or interact with, is dependent on a number of underlying concepts, called "entitlements". Access control is not only influenced by the identity of the user, but also by piloting controls within an environment, certification standards and the particular user devices being used.

Figure 9:
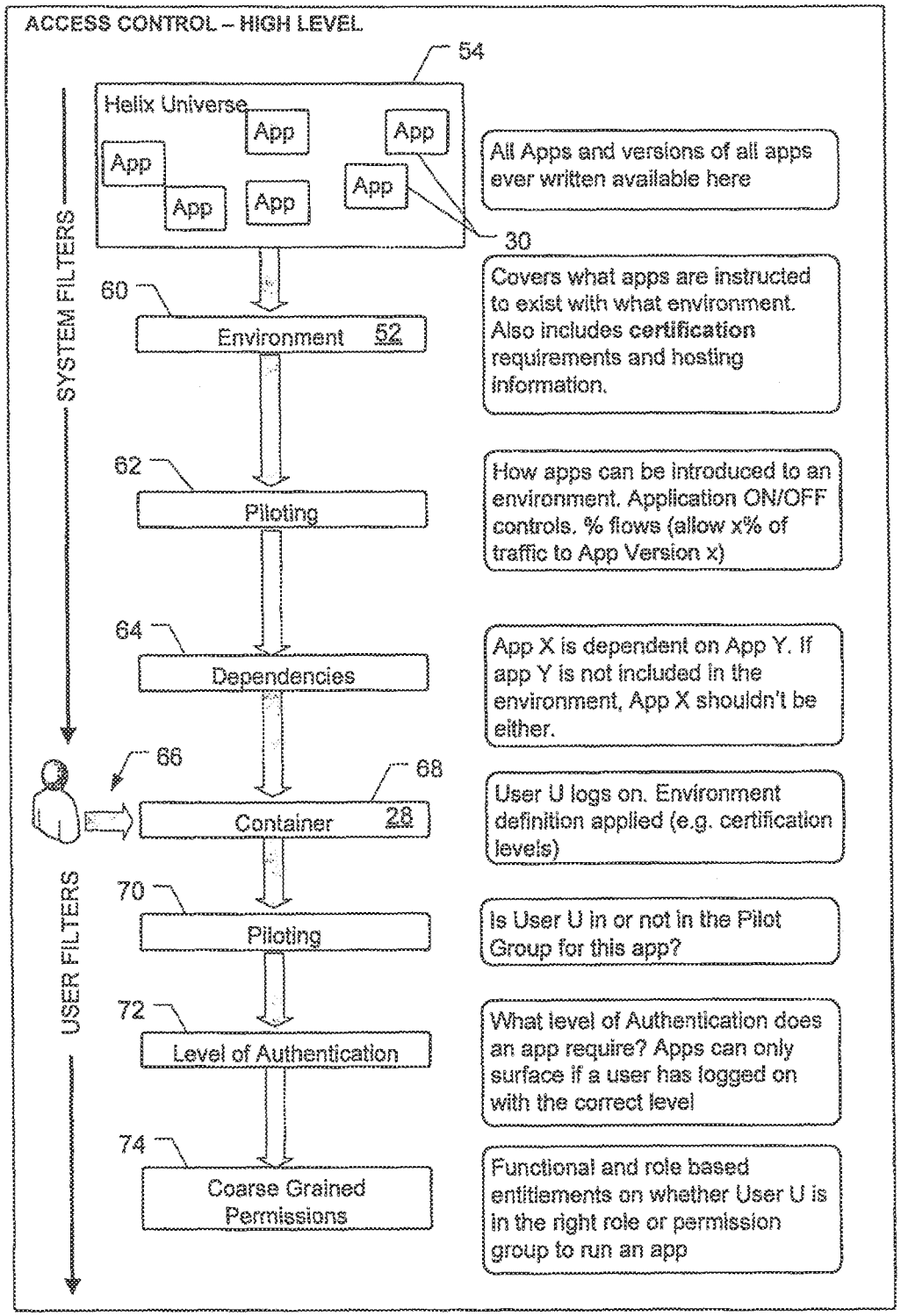
FIG. 9 shows high level access control and filtering of application modules of FIG. 1, in order to be accessed by a user through a container module, in accordance with an example embodiment.

The high level access control diagram of FIG. 9 provides an overview of the various steps of control and primary inputs to a universe 54 through an environment 52 and its associated definition, as well as to a container module 28. The control results in the filtering of application modules 30 in order to provide a user access to an executable composite software application in the form of a website or application via the particular container module 28. This holistic approach allows for the dynamic construction of a run-time environment that plays to the networked environment of the present invention's strengths and underlying architecture principles, which includes deployment which is agile, configurable and flexible. The access control defines what application module 30 goes where, whom may use what application module 30 and under what circumstances.

Universe

In the enterprise universe 54, all application modules 30 (including all versions of such application modules) are available (See 'Universe' above). As mentioned, the relevant information is obtained by the universe from the hosts (i.e. all manifests of application modules 30 in a particular host), Certificate information is obtained from the certification authority.

Environment Definition

The networked system 10 filters the universe 54 in terms of a particular environment definition 50, which defines which application modules 30 may exist in the environment 52. The environment definition 50 includes, for example, at least certification requirements and hosting information relating to application modules 30. (See also 'Environment definition above').

Figure 10:
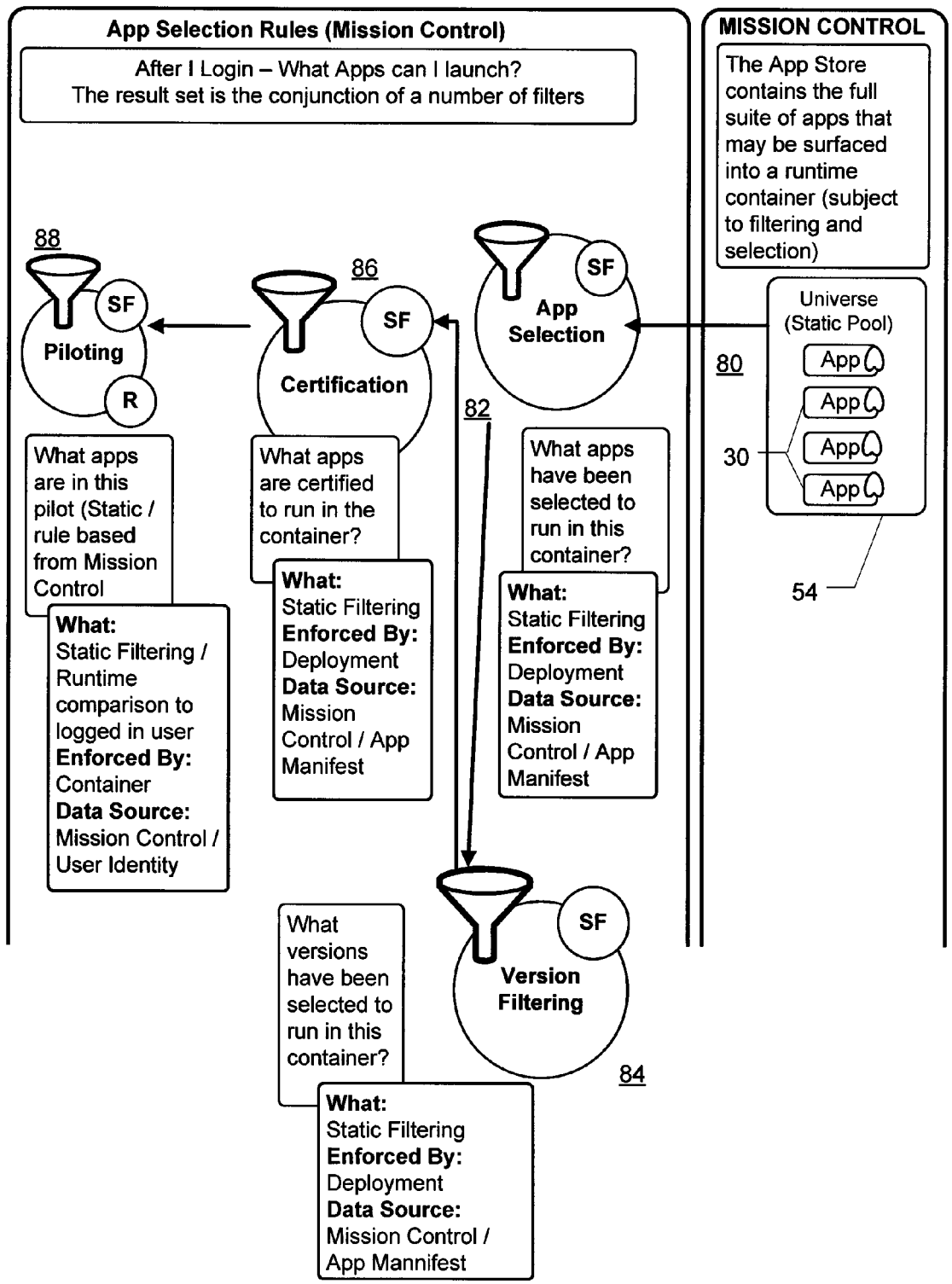
FIG. 10 shows a diagrammatic flow diagram of various steps of filtering application modules from a universe, in accordance with an example embodiment.

FIG. 10 shows system filtering in terms of the environment definition performing the following functionality;

- at 80, the universe 54 supplies the list of all available application modules 30 (which includes all versions of the application modules);
- at 82, (i.e. application selection) an environment subset of application modules 30 are selected for this run-time environment (this is done in view of the environment definition which also identifies the container module as a entry point to the environment) (see also step 60 of FIG. 9); in one example embodiment this is a static filtering step, enforced by deployment and the data source is mission control and/or the application manifest;
- at 84, versions of application modules 30 (i.e. version filtering) are selected based on rules defined by the environment definition; in one example embodiment this is a static filtering step, enforced by 'deployment' and the data source is mission control and/or the application manifest; and
- at 86, environment certification requirements are checked against certifications applied to application modules 30 (i.e. certification), which certifications are specified in the environment definition, e.g., a minimum level of certification may be stipulated by the environment definition, in one example embodiment this is static filtering, enforced by 'deployment' and the data source is mission control and/or application manifest.

System Level Piloting

From piloting (at 88 in FIG. 10 or step 62 in FIG. 9), information is obtained in relation to how application modules 30 are to be introduced in the environment 52. In other words, piloting at the system level allows a particular version of an application module 30 to be piloted based on a nominated percentile. In one example embodiment, input factors, such as the particular logged-on user, are not taken into account and piloting is based merely on a percentage. However, a person skilled in the art will appreciate that in some example embodiments, filtering may be based, in addition or in the alternative, on user attributes such as user location, segment or the like.

As shown in FIG. 10 at 88, piloting may be done in one example embodiment by static filleting and/or runtime comparison to logged in user, enforced by the container module and the data source is mission control and/or user identity.

One of the benefits of system level piloting is, the deployment of two application modules 30 side by side, i.e. version A and version B. Version B is piloted to only 10% of traffic, i.e., 10% of containers launched. This enables the ability to progressively roll out functionality between one application module version and another, so that factors such as application module stability, sociability and performance can be monitored and assessed under controlled conditions.

Dependencies

In terms of dependencies, only application modules 30 that are either independent, or are launched together with their dependent application modules 30, will be launched through a container module 28 (see step 64 of FIG. 9). In other words, if an application module 30 is to be launched but the application module 30 on which it is dependent is not included in an environment 52, the first mentioned application module 30 will also not be launched.

Launching the Container Module

When a user logs onto the networked system 10, (reference numeral 66 in FIG. 9) through a container module 28, the relevant environment definition 50 which has defined the container module 28 as entry point is applied, thereby filtering the universe. Only the application modules 30 that comply with the criteria set out by the environment definition will be launched as part of the software application through the container module.

It is then determined whether or not the user forms part of a pilot group and what the level of authentication required by the application module 30 is (step 70 and 72 in FIG. 9). Application modules would only surface if a user has logged on with the correct level of authentication. It is also determined whether the user has the right role or permission to run the application module 30 (step 74 in FIG. 9).

User Identity Enrichment

Referring now to step 70 of FIG. 9 in more detail, in one example embodiment of the present invention multi-identity of users is supported. It follows that application modules 30 of the present invention would therefore not necessarily be written to rely on classic identifiers such as specific user-IDs. Also, authenticator modules may not be able to provide these IDs at the time of authentication. One example would be where a customer accesses a module via their linking Facebook ID. In this type of scenario, the underlying linking of IDs needs to be fetched post-authentication, but potentially pre-application module launch.

Figure 11:
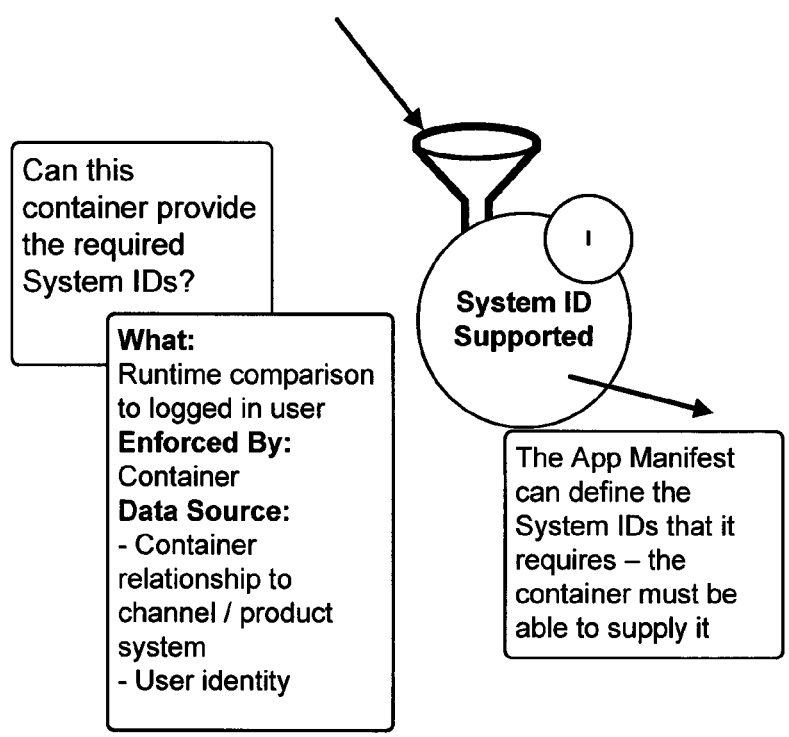
FIG. 11 shows a further step of the filtering process of FIG. 10, in accordance with an example embodiment.

An application module 30 that depends on the existence of such an identifier is to declare that dependency in its manifest, and the application module 30 will or will not launch depending on whether or not the container module 25 has the capacity to supply such an identifier as demanded, as explained above. See FIG. 11 in this regard where it is shown that in one example embodiment, a runtime comparison to the logged in user is used, that it is enforced by the container module and that the data sources are the container relationship to channel/product system and the user identity.

Level of Authentication

Figure 12:
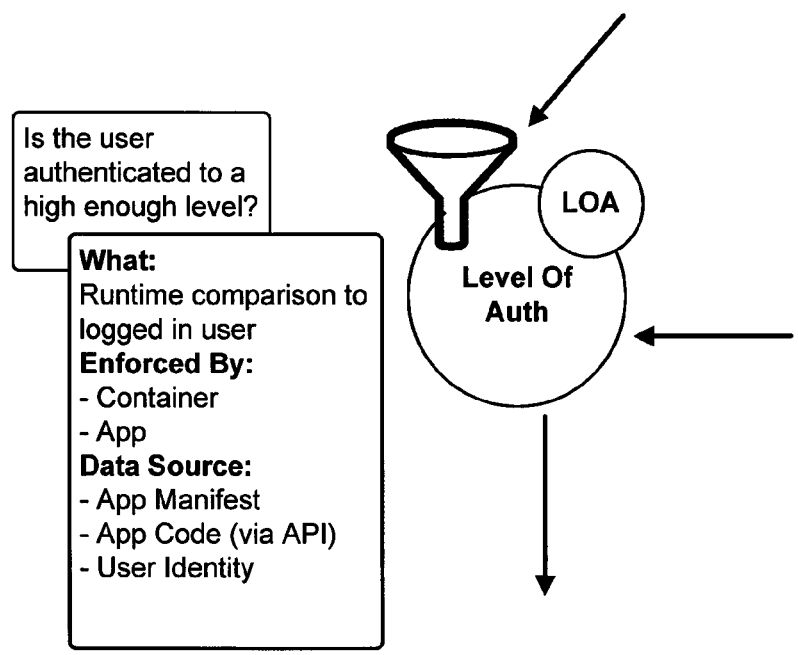
FIG. 12 shows yet a further step of the filtering process of FIG. 10 where filtering is undertaken by considering the level of authentication of a user, in accordance with an example embodiment.

FIG. 12 (also step 72 of FIG. 9) indicates filtering by taking into account the level of authentication of a user. In this regard, an application module 30 defines in its manifest 42 the level of authentication required for the application module 30 to be launched. So for example, an anonymous user that attempts to access a secured application (requiring a password level of authentication at a minimum) would have to go through an authentication process first.

Not only can an application module 30 define a minimum level of authentication for launching, it can define security minimums around any of its underlying resources, e.g., dataServices or exposed navigation endpoints. For example parts of an application module 30 may incorporate extra security and require, for example, a 2FA OTP in order to access it. Any pages and/or services would therefore be nominated to work only at that level.

In the example embodiment of FIG. 12, a runtime comparison to the logged in user is used, it is enforced by the container module and the application module and the data sources are the application manifest, the application code (via API) and the user identity.

Entitlements

Figure 13:
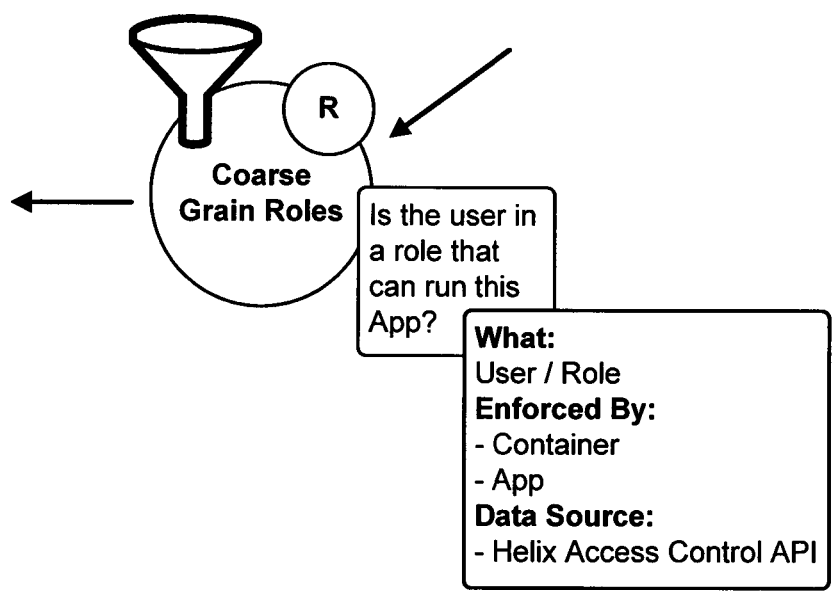
FIG. 13 shows a further step of the filtering process of FIG. 10 where coarse-grained entitlements are taken into account, in accordance with an example embodiment.

Fine-grained entitlements exist in relation to individual application modules 30. Coarse-grained entitlements are, controlled by the networked system platform and incorporate factors such as user authentication, environments 52, piloting and functional cheeks. Coarse-grained access control is therefore the control mechanism that defines what application modules a user can or cannot get access to (See FIG. 13 and step 74 of FIG. 9). As shown by FIG. 13, in this example embodiment, the functionality is enforced by the container module and the application module and the data source is the access control API of the system.

Role Based Entitlements

Coarse-grained role based permission accordingly checks to control whether an application module 30 can be accessed or loaded. It takes a provider based approach and delegates the task of role based extraction to the implementing container module.

An application module 30 declares simple role based membership demands as part of its manifest file. It is a requirement of the container module 28 to pre-fetch any role based data for the logged in user, so that a run-time comparison can be made on application module launch.

Fine-Grained Entitlements

Fine-grained entitlements are an internal concern of the application module 30 and are fully controlled by the application module 30. That is to say, there are no concepts that the networked system concerns itself with, that controls how an application module 30 defines and manages entitlement and/or permission checks at both administration and run-time.

It is important to note that filters may be applied at different times, meaning some application modules may be applicable for a run-time environment, but then are made not applicable based on who logs in.

Application Module Authentication

Application module authentication is the process of establishing authentication and/or session trust to application modules 30 that are launched via a pre-authenticated container module 28. The container module 28 holds the primary authentication assertions post logon, and as application modules 30 are loaded, this assertion is passed on, as part of the launch parameters.

According to one example embodiment of the invention, authenticator modules use as a security token a SAML based assertion (providing broader integration capability to various identity providers). However, application module assertions may use JSON Web Token (JWT) types, in one example embodiment. This is indicated by the high-level application module authentication diagram 1400 of FIG. 14. In prior art web security systems, a typical deployment scenario would be defined by access to an entire, singular application, typically contained under one web host. Authentication and session management would then occur within the application, with underlying pages and resources secured by the parent site.

The access of the application by a user results in a required authentication event. The authentication event is handled and serviced via the launching of the required authenticator application 1402 which is specific for the expected user type. In prior art systems, the application itself hosts the authentication screen, while the application controls authentication success or failure within its own context. The authenticator application 1402 may be the same or similar to the authenticator application module 58 described above. In these systems, once authenticated, subsequent HTTP requests are secured by a session cookie or a bearer token in order to grant access. Each page is then a dependent resource on the one primary session cookie. Presentation logic is primarily located on the server side, i.e., on the application's web tier. Business services are invoked by the web tier and not from the client browser. Logout, or destruction of the session cookie, disables subsequent access to the entire application.

Figure 14:
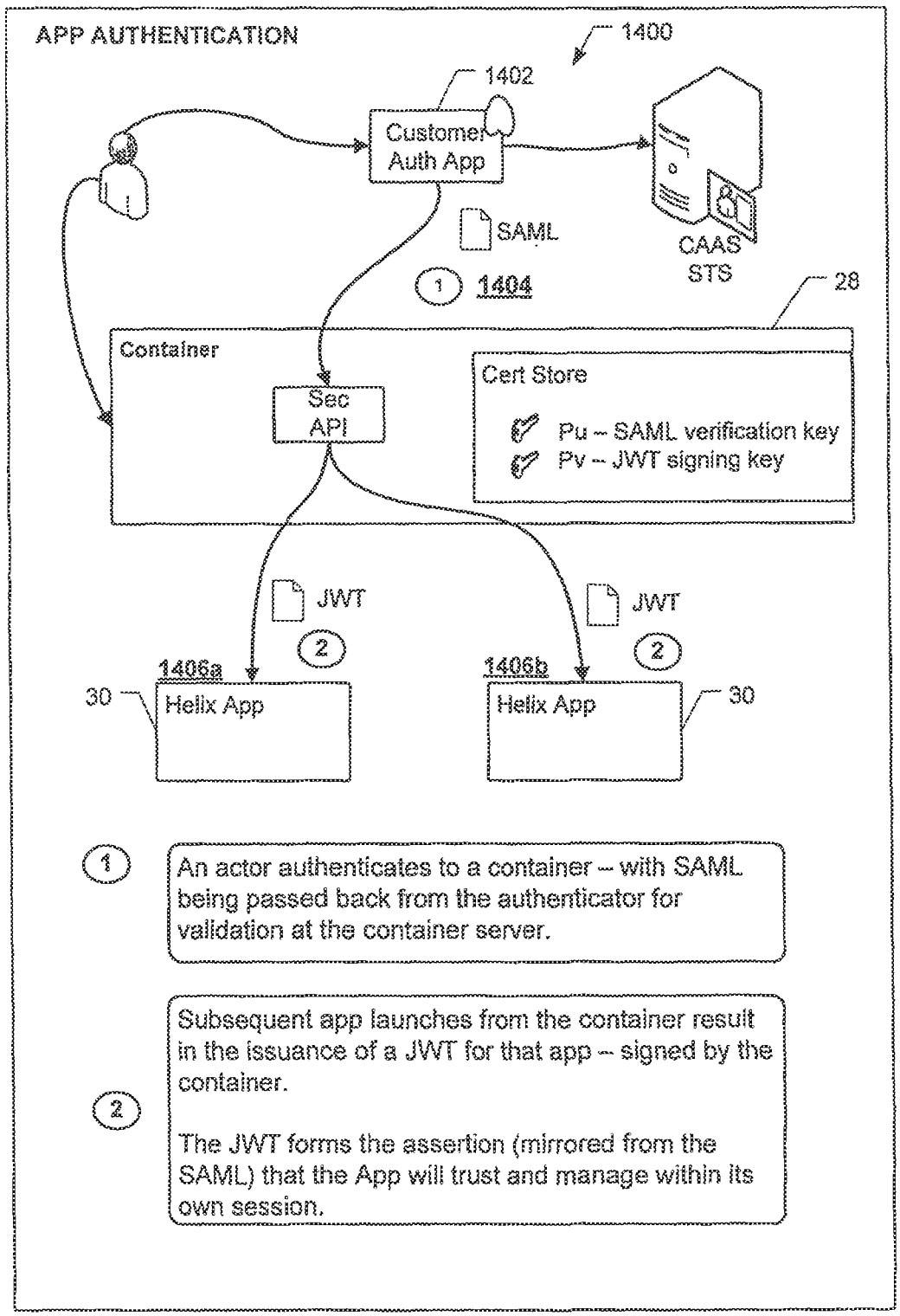
FIG. 14 is a high-level diagram of an application module authentication process, in accordance with an example embodiment.

As particularly shown in the example embodiment of FIG. 14, at reference numeral 1404, a user authenticates to a container module 28 with SAML being passed back from the authenticator application 1402 for validation at the container server. As indicated by reference numeral 1406a and 1406b, subsequent application module launches from the container module 28 results in the issuance of a JWT for that particular application module, signed by the container module 28. The JWT forms the assertion (mirrored from the SAML) that the application module will trust and manage within its own session.

Composite (Container) Module Security

Container module security in accordance with one example embodiment of the present invention follows an approach in which access is to a container module 28 or server application defined by a single host. Authentication is provided by authentication application modules and session management occurs against that container module 28. Functionality is provided by the invocation of the separate (authentication) application modules that are launched, in one example embodiment, in an iFrame. It will be appreciated that the authentication application modules may be launched using a variety of techniques including (but not limited to) HTML DOM injection or an embedded browser controls. These application modules receive identity context on launching and may potentially manage their own session.

Figure 15:
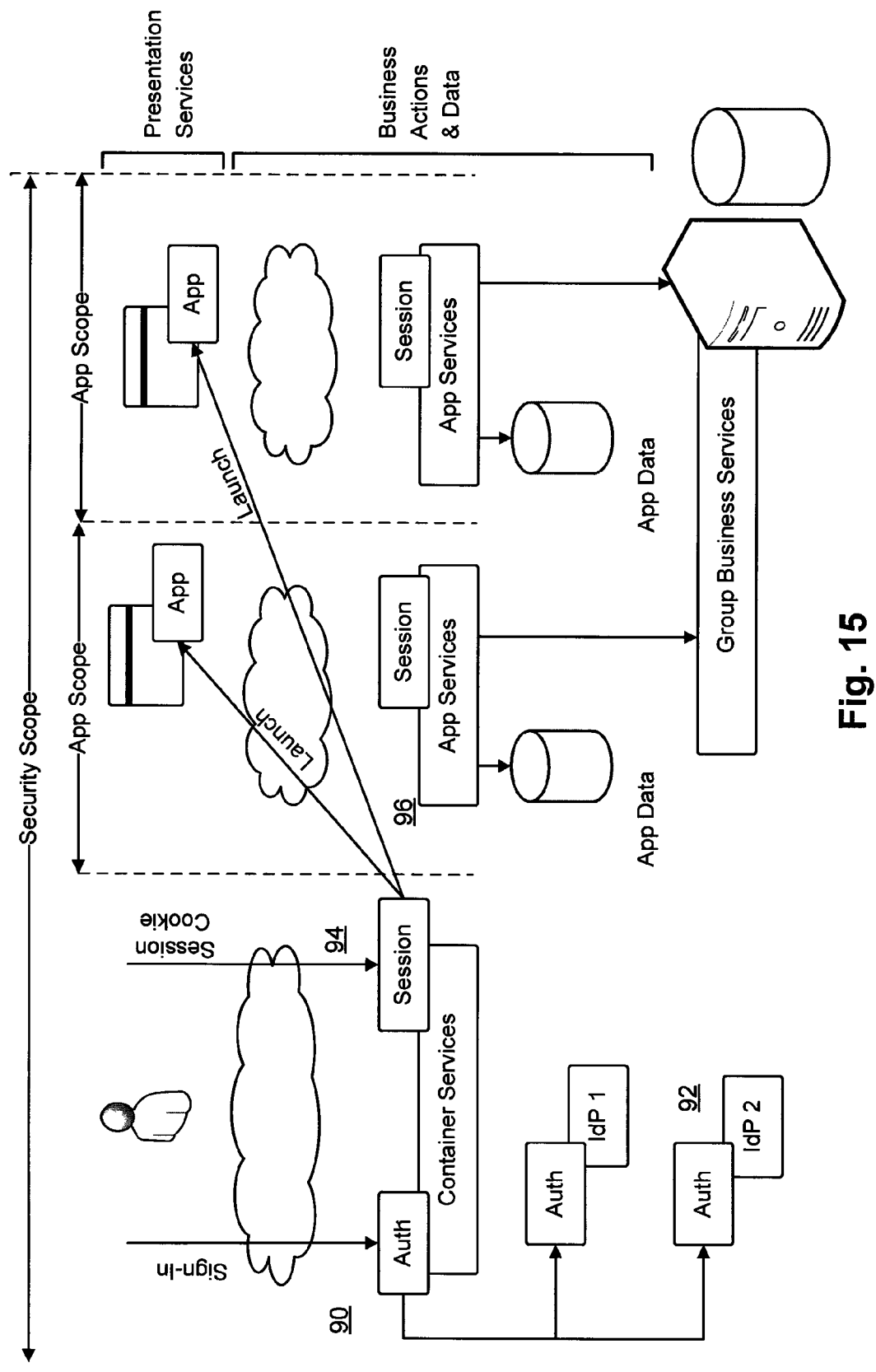
FIG. 15 indicates diagrammatically the distributed nature of the security functionalities of container modules and application modules, in accordance with an example embodiment.

FIG. 15 highlights the distributed nature of the security context of the present invention. In the networked system shown in this figure, access of the container module 28 results in a required authentication event (see reference numeral 90). The container module 28 itself does not host the authentication screen, but delegates this task to a federation provider (Passive Federation) 92. Once authenticated, subsequent HTTP requests are secured by a session cookie or bearer token 94 which grants access to the container module only.

Each application module 30 must pass authentication context on its launch (see reference numeral 96). This pass is obtained from the container module 28, with the application module 30 not itself interacting with the Federation Provider.

The presentation logic is primarily located on the client side, i.e. on the web browser, while business services are invoiced by the client script. Application services take the role that a web server would have normally taken.

Logout or destruction of the session cookie disables subsequent access to the container module only. The container module instigates a distributed application logout process, as each application module may potentially control its own session.

Container Module Authentication

Figure 16:
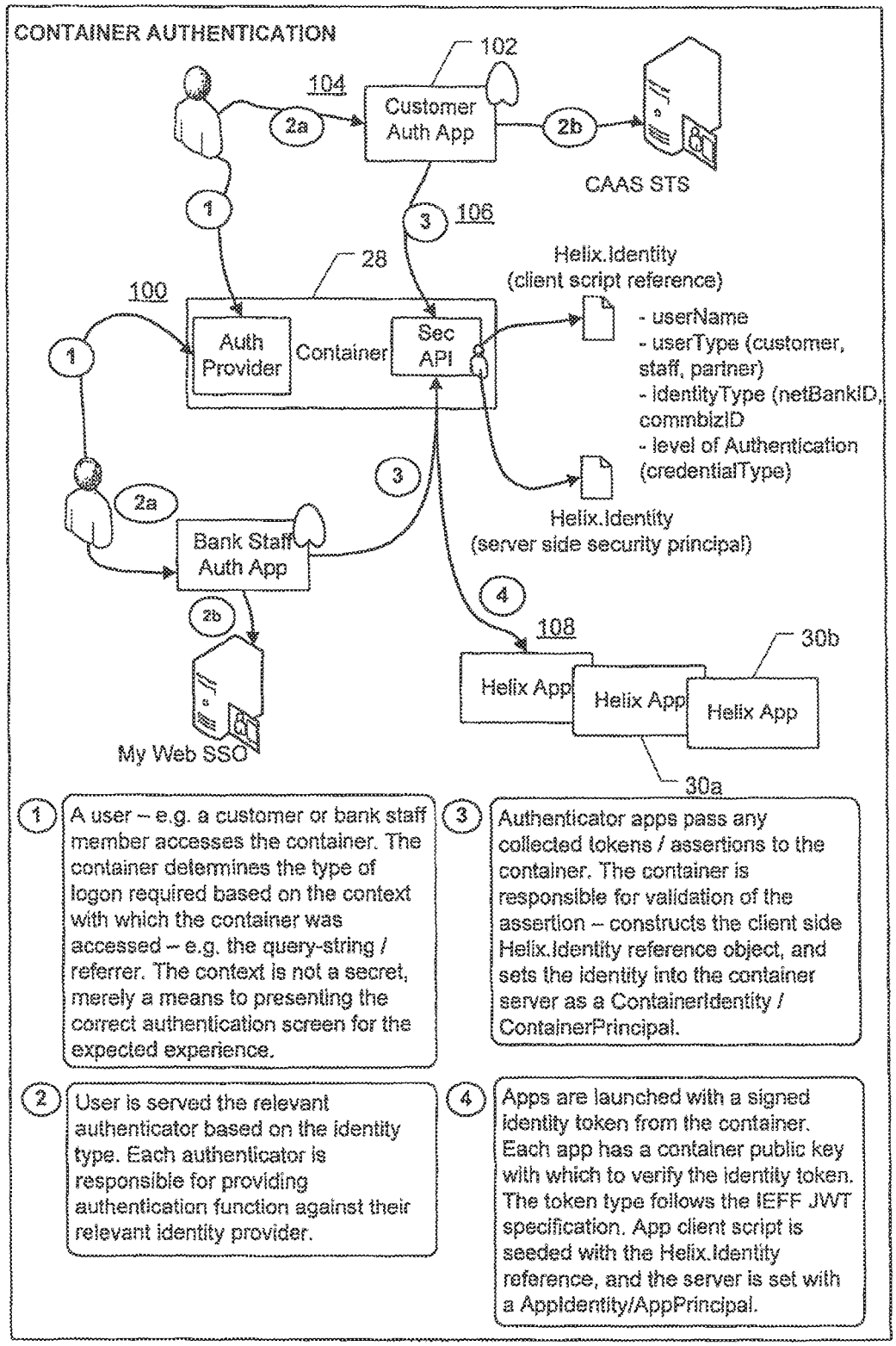
FIG. 16 shows diagrammatically the authentication process of a container module, in accordance with an example embodiment.

A container module 28 is the first point of access for a user. As container modules 28 may either be web-based or native, authentication must work in either scenario. The first step 100 of container module security is now described in more detail with reference to FIG. 16.

The authentication of the container module 28 is left to the authenticator application modules 102, which run the authentication process. These modules 102 are distinct in that they declare a capability to provide identity data. Authenticator application modules 102 are registered with the container module 28 like any other application module 30 and are invoked when the container module 28 demands an authentication process. The authenticator application modules 102 may be the same or similar to the authenticator application module 58 and 1402 described above.

The steps of the authentication process starts with a user accessing a container module 28 at 100. The container module 28 determines the type of logon required based on the context with which the container module 28 is accessed e.g., whether it was received through a referrer which provides, intention or through a query-string. Typically, the context is not a secret, and merely a means to presenting the correct authentication screen for the expected experience.

At step 104, the user is then served with the relevant authenticator application module 102 based on the identity type. Each authenticator application module 102 is responsible for providing authentication functionality against their relevant identity provider.

The authenticator application modules 102 pass any collected tokens or assertions on to the container module 28, which is then responsible for the validation of the assertions. (Sec step 106). The container module constructs the client side identity reference object and sets the identity into the container module server as a Container Identity or Container Principal.

Application modules 30 are then bunched at 108 with a signed identity token from the container module. Each application module has a container public key with which to verify the identity token. The token type typically follows the IEFF JWT specification. The application client script is seeded with the Enterprise_Identity reference, and the server is set with an Application_Identity or an Application_Principal.

Delegating the authentication process to an application module has a number of benefits. For example, any number of different authenticator application modules 102 may be built even though the contract between the container module and the authenticator module remains consistent. The ability to plug-in new authentication module types is thus also trivial.

The ability to uplift the security process through application module revisions means security uplift can be rolled out and/or rolled back in a way similar to the roll out of other application modules. Web-based authenticator application modules 102 also may provide authentication capabilities to both native and web-based containers with no change to the architecture necessary.

The user experience of the authentication process is handled in similar way to all other application modules, i.e. authentication and/or step-up logic can be underpinned by the same technology that manages adaptive user interface and theming.

Dynamic Level of Authentication—Injecting Authenticators

As the security controller, the container module 28 is responsible for surfacing the relevant authenticator application modules 82 based on the authentication demanded by the container module 28. In terms of the user interface, the authenticator application modules 82 may swap into and out of view, depending on the design of the container module 28. In one non-limiting example, single document interface style container modules 28 may be swapped by the authenticator application module 102 into the primary iframe, while for multiple document interfaces, authenticator application modules 82 may be surfaced through a modal dialog.

Figure 17:
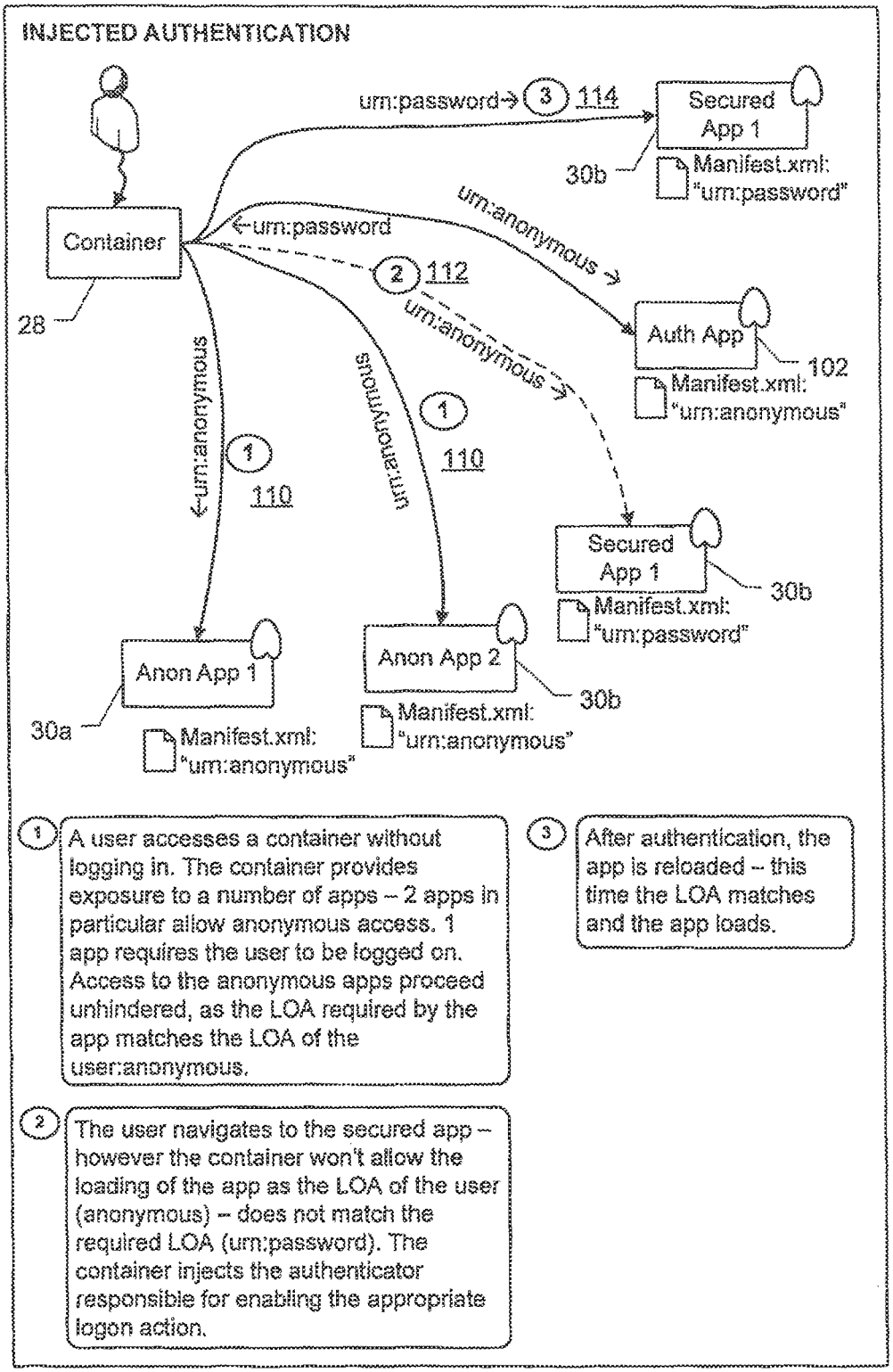
FIG. 17 shows a simple example of injected authentication where a user accesses application modules anonymously, as an authorised user and as a secured user.

FIG. 17 shows a simple, example of injected authentication where a user accesses application modules 30a and 30b anonymously and as a secured user.

As shown by reference numeral 110, a user accesses a container module 28 without logging in. The container module 28 provides exposure to a number of application modules 30a and 30b, two of which (30a) allow anonymous access. A third application module 30b requires the user to be logged on. Access to the anonymous application modules 30a proceed unhindered as the level of authorisation required by the application modules 30a matches the level of authorisation of the user (i.e. anonymous).

At 112, the user navigates to a secured application module 30b. In this scenario, the container module 28 will not allow the loading of the application module 30b as the level of authorisation required by the application module 30b (i.e. urn:password) does not match (in fact, it exceeds) the level of authorisation of the user (anonymous). The container module 30b then injects the authenticator application module 102 responsible for enabling the appropriate logon action.

After authentication, at 114, the application module 30b is reloaded, this time with the level of authorisation of the user matching the level of authorisation of the application module 30b. The user may now access this application module 30b.

Native vs Web Authentication

As previously mentioned, the networked system 10 is to support both native and web-based deployments and thus, the authentication process must be consistent and repeatable across both platforms.

To achieve this, the authentication design revolves around two key principles, namely that authenticator application modules 102 are implemented as application modules (as described above) making it viable to drop the authenticator application modules 102 into any container module 28. Additionally, authentication is always performed as a web view. Thus, native applications are also to invoke a web-based authenticator module. This is consistent with many modern native applications that rely on external identity providers, such as Google, Amazon, Facebook etc.

Credentials of a user are never entered into a website other than one owned by the owner of the networked system (i.e. the authenticator is issued from an enterprise web address, not a myriad of login forms hosted here and there). The web view also enables authentication to occur in scenarios where integrated native authentication cannot occur, e.g., where staff is to access the container module from a tablet, such as an iPad, in a branch.

An authenticator application module 102 is responsible for communicating to an Identity Provider and to implement the user interface to harvest credentials from a user. However, SAML assertions are only passed back to the container module for verification. They are not processed by the application module itself.

The dynamically loadable composite software application design of the present invention addresses shortcomings in traditional software applications. The present invention particularly allows for the partitioning of the features of the software application in a more modular fashion, (i.e. the application modules) allowing different parts of the software application to be changed incrementally and individually. Also, the dynamically loadable composite software application design of the present invention provides for features, represented by the application modules, to be portable between different user devices. The present invention also allows for features to be packaged and re-used as application modules between different software applications.

What is claimed is:
1. A method comprising:
 maintaining an enterprise universe including multiple application modules, each application module configured to provide a particular functionality of an executable composite software application;

receiving a request from a user device to launch a particular executable composite software application in a first container module associated with the user device;
retrieving one or more criteria for filtering the enterprise universe, the one or more criteria including at least one of a minimum certification level of an application module and a predefined user level of authentication;
filtering the enterprise universe based on the one or more criteria to result in a first subset of application modules, each application module in the first subset of application modules configured to provide a particular functionality of the particular executable composite software;
identifying any application modules in the first subset of application modules that are dependent on an application module not in the first subset of application modules;
excluding any identified application modules from the first subset of application modules to result in a modified first subset of application modules; and
sending one or more application modules from the modified first subset of application modules to the user device for dynamic loading by the user device into the particular executable composite software application.

2. The method as claimed in claim 1, wherein the one or more criteria are linked to the first container module.

3. The method as claimed in claim 1, wherein the one or more criteria further includes a piloting requirement, the piloting requirement used to determine a particular version of an application module to be included in the first subset of application modules.

4. The method as claimed in claim 1, further comprising:
selecting one or more application modules from the modified first subset of application modules based on user information received as part of the request; and
sending the one or more selected application modules to the user device for dynamic loading by the user device into the particular executable composite software application.

5. A system comprising:
a processor; and
a memory storing:
multiple application modules, each application module being configured to provide a particular functionality within an executable composite software application;
multiple container modules, each container module configured to launch one or more of the application modules as part of an executable composite software application from a user device; and
a program configured to be executed by the processor, the program including instructions for:
receiving a request from a user device to launch a particular executable composite software application in a particular container module;
retrieving one or more criteria, the one or more criteria including at least one of a minimum certification level of an application module and a predefined user level of authentication;
filtering the multiple application modules based on the one or more criteria to result in a first subset of application modules, each application module in the first subset of application modules configured to provide a particular functionality of the particular executable composite software application;
identifying any application modules in the first subset of application modules that are dependent on an application module not in the first subset of application modules;
excluding any identified application modules from the first subset of application modules to result in a modified first subset of application modules;
sending one or more application modules from the modified first subset of application modules to the user device for dynamic loading by the user device into the particular executable composite software application.

6. The system as claimed in claim 5 wherein the one or more criteria are linked to the particular container module.

7. The system as claimed in claim 5 wherein the one or more criteria further includes a piloting requirement, which is used to determine particular version of an application module to be included in the first subset of application modules.

8. The system as claimed in claim 5 wherein the processor and/or memory forms part of one or more servers.

9. The system as claimed in claim 5, further comprising:
selecting one or more application modules from the modified first subset of application modules based on user information received as part of the request; and
sending the one or more selected application modules to the user device for dynamic loading by the user device into the particular executable composite software application.

10. A method comprising:
maintaining:
multiple application modules, each application module configured to provide a particular functionality within an executable composite software application; and
multiple container modules, each container module configured to launch one or more of the application modules as an executable composite software application from a user device;
receiving one or more criteria from a user, the one or more criteria including at least one of a minimum certification level of an application module and a predefined user level of authentication;
filtering the multiple application modules into a first subset of application modules based on the one or more criteria;
identifying any application modules in the first subset of application modules that are dependent on an application module not in the first subset of application modules;
excluding any identified application modules from the first subset of application modules to result in a modified first subset of application modules,
wherein the executable software application is to be dynamically loaded with the modified first subset of application modules through a particular container module associated with the user device.

11. The method as claimed in claim 10, wherein the one or more criteria further includes a piloting requirement, the piloting requirement used to determine a particular version of an application module to be included in the first subset of application modules.

12. The method as claimed in claim 10, wherein the one or more criteria are linked to the particular container module.

13. The method as claimed in claim 10, further comprising:
sending the application modules in the modified first subset of application modules to the user device for dynamic loading by the user device into the executable composite software application.

14. A system comprising:
a processor; and
a memory storing:
   multiple application modules, each application module configured to provide a particular functionality within an executable composite software application;
   multiple container modules, each container module configured to launch one or more of the application modules in the executable composite software application from a user device;
a program configured to be executed by the processor, the program including instructions for:
   receiving one or more criteria from a user, the one or more criteria including at least one of a minimum certification level of an application module and a predefined user level of authentication;
   filtering the multiple application modules into a first subset of application modules based on one or more criteria;
   identifying any application modules in the first subset of application modules that are dependent on an application module not in the first subset of application modules;
   excluding any identified application modules from the first subset of application modules to result in a modified first subset of application modules,
   wherein the executable composite software application is to be dynamically loaded from the modified first subset of application modules through a particular container module associated with the user device.

15. The system as claimed in claim 14 wherein the one or more criteria further includes a piloting requirement, the piloting requirement used to determine a particular version of an application module to be included in the first subset of application modules.

16. The system as claimed in claim 14 wherein the processor and/or the memory forms part of one or more servers.

17. The system as claimed in claim 14, wherein the one or more criteria are linked to the particular container module.

18. The system as claimed in claim 14, further comprising:
   sending the application modules in the modified first subset of application modules to the user device for dynamic loading by the user device into the executable composite software application.

\* \* \* \* \*